US010649880B2

United States Patent
Plicanic Samuelsson et al.

(10) Patent No.: US 10,649,880 B2
(45) Date of Patent: May 12, 2020

(54) MEASUREMENT COORDINATION BY MONITORING OF PROGRAM CODE EXECUTION

(71) Applicant: Qoitech AB, Lund (SE)

(72) Inventors: Vanja Plicanic Samuelsson, Lund (SE); Kåre Agardh, Rydebäck (SE); Gunnar Klinghult, Lund (SE)

(73) Assignee: Qoitech AB, Lund (SE)

( * ) Notice: Subject to any disclaimer, the term of this patent is extended or adjusted under 35 U.S.C. 154(b) by 340 days.

(21) Appl. No.: 15/620,383

(22) Filed: Jun. 12, 2017

(65) Prior Publication Data

US 2017/0357564 A1 Dec. 14, 2017

(30) Foreign Application Priority Data

Jun. 14, 2016 (EP) ..................................... 16174375

(51) Int. Cl.
*G06F 11/30* (2006.01)
*G06F 11/34* (2006.01)
*G06F 11/36* (2006.01)

(52) U.S. Cl.
CPC ........ *G06F 11/3495* (2013.01); *G06F 11/302* (2013.01); *G06F 11/3013* (2013.01); *G06F 11/3055* (2013.01); *G06F 11/3062* (2013.01); *G06F 11/36* (2013.01); *G06F 11/362* (2013.01); *G06F 11/3058* (2013.01); *G06F 2201/865* (2013.01)

(58) Field of Classification Search
None
See application file for complete search history.

(56) References Cited

U.S. PATENT DOCUMENTS

| 2003/0191976 | A1* | 10/2003 | Cyran | ................ G06F 11/3017 713/340 |
| 2006/0253691 | A1 | 11/2006 | Barraclough et al. | |
| 2009/0327784 | A1 | 12/2009 | Shah et al. | |
| 2012/0011378 | A1 | 1/2012 | Dalton et al. | |
| 2012/0084028 | A1 | 4/2012 | Kumar et al. | |
| 2014/0229754 | A1* | 8/2014 | Overby | ............... G06F 11/3062 713/340 |
| 2016/0124443 | A1* | 5/2016 | Reda | ...................... G06F 1/203 700/282 |

FOREIGN PATENT DOCUMENTS

| CN | 1129069 C | 11/2003 |
| CN | 101164041 A | 4/2008 |
| CN | 102902618 A | 1/2013 |
| WO | 96/20442 A1 | 7/1996 |

OTHER PUBLICATIONS

Communication with European Search Report, EPO Application No. 16174375.2, dated Dec. 9, 2016, 8 pp.
First Office Action with English language translation, CN Application No. 201710447195.8, dated Jan. 15, 2020, 20 pp.

* cited by examiner

*Primary Examiner* — Phuong Huynh
(74) *Attorney, Agent, or Firm* — Myers Bigel, P.A.

(57) ABSTRACT

The one or more processors of an electronic device execute program code. While executing the program code, measurements are performed on the electronic device to obtain first data. Further, execution of the program code is monitored to obtain second data, e.g., debug information. The measurements are coordinated with the monitoring of the execution of the program code.

15 Claims, 4 Drawing Sheets

MEASUREMENT COORDINATION BY MONITORING OF PROGRAM CODE EXECUTION

CROSS-REFERENCE TO RELATED APPLICATION

The present application claims priority to European Patent Application No. 16174375.2, filed Jun. 14, 2016, the disclosure of which is hereby incorporated herein by reference in its entirety.

FIELD OF THE INVENTION

The present invention relates to methods of testing electronic devices and to corresponding apparatuses.

BACKGROUND OF THE INVENTION

In various technical fields, power saving and power efficiency is an important aspect of product design. While energy efficiency is generally desirable in view of costs associated with energy generation, it is also of particular relevance in the case of battery operated devices. In this case, a better energy efficiency can increase the time a device can be operated without recharging or changing the battery (also referred to as battery life).

One example of devices where energy efficiency is considered to be of high relevance are IoT (Internet of Things) devices, which are electronic devices equipped with communication functionalities which are utilized without specific user activity, e.g., sensors or actuators. The potential number of such devices is expected to be much higher (exceeding 50 Billion in the next few years) than in the case of conventional user operated communication devices (such as mobile phones), which means that these devices may also cause significant energy consumption.

In the case of battery operated devices, energy efficiency also has an impact on usability. For example, high energy consumption and associated poor battery life may adversely affect user experience and render a product unattractive to consumers.

During development of a product, it may however be a demanding task to identify problems causing excessive energy consumption and to solve such problems, specifically in view of the fact that such problems may arise from software running on the device, hardware running on the device, or from interaction of the software and hardware.

There are measurement equipment for current, power and energy measurements available that can be used in product development, ranging from simple measurement tools to advanced systems for power analysis. In many cases, expensive advanced systems as well as high levels of experience and expertise of developers are needed to identify and solve problems causing excessive energy consumption.

SUMMARY OF THE INVENTION

Accordingly, there is a need for techniques that allow for efficiently testing electronic devices.

According to an embodiment a method for testing an electronic device is provided. The method comprises executing program code by one or more processors of the electronic device. While executing the program code, measurements are performed on the electronic device to obtain first data. The first data may include results of the measurements or data derived therefrom. Further, the method comprises monitoring execution of the program code to obtain second data. The measurements are coordinated with the monitoring of the execution of the program code. In this way, the measurements may be performed in an efficient manner and detection of problems related to the execution of the program code may be facilitated.

According to an embodiment, the first data are correlated with the second data. For example, in this way a part of the program code may be identified which causes an anomaly observed in the first data.

According to an embodiment, the method further comprises controlling the measurements depending on the second data. This may comprise selecting a measurement range, measurement sensitivity, and/or measurement sampling interval depending on the second data. For example, if the second data indicate that the electronic device performs a certain operation which potentially causes excessive energy consumption, the measurement range, measurement sensitivity, and/or measurement sampling interval may be set accordingly. This may involve widening the measurement range or focusing the measurement range on an expected range of interest, increasing measurement sensitivity, and/or shortening the measurement sampling interval. Accordingly, parameters for controlling the measurements may be adjusted dynamically to optimize the measurements depending on the operational status of the electronic device.

In addition or as an alternative, a measurement type may be selected depending on the second data. For example, under certain operational conditions of the electronic device, as indicated by the second data, measurement of energy consumption, e.g., in terms of current consumption or power consumption, and/or absolute consumed energy, may be selected. Under other operational conditions of the electronic device, as indicated by the second data, measurement of temperature may be selected.

In addition or as an alternative, one or more measurements may be triggered depending on the second data. For example, under certain operational conditions of the electronic device, it may be desirable gain information about a temperature distribution within the electronic device. The temperature distribution may allow for identifying hardware elements with excessive current leakage or overloaded hardware elements. The temperature distribution may for example be obtained by capturing one or more thermal images of the electronic device or parts thereof. Accordingly, in some scenarios the second data may be used to trigger capturing of one or more thermal images.

According to an embodiment the first data comprise data representing energy consumption of the electronic device, e.g., in terms of a current, a power, or an energy. The current, power, or energy may be measured by one or more internal sensors of the electronic device or by one or more external sensors coupled to the electronic device. Alternatively or in addition, the first data may comprise data representing a temperature of the electronic device. The temperature may be measured by internal sensors of the electronic device or by external sensors coupled to the electronic device.

According to an embodiment, the first data may comprise thermal images of at least a part of the electronic device. Such thermal images may be captured by an infrared camera, e.g., an LWIR (Long Wave Infrared Camera). The LWIR camera may be cooled or uncooled.

According to an embodiment, the second data comprise debug information from execution of the program code, e.g., information identifying and/or describing an instruction or routine of the program code which is currently being executed. Alternatively or in addition, the second data may comprise data identifying an operation and/or status associated with the execution of the program code, e.g., whether execution of the program code caused switching of the electronic device to a low power mode or activation of communication circuitry. According to an embodiment, the second data comprise application level information associated with the execution of the program code, e.g., information identifying an application which is currently being executed as part of the program code or a function within such application, e.g., activation of IP (Internet Protocol) based audio and/or video communication by a messaging application.

According to an embodiment, the second data comprise parameters for controlling the measurements. For example, these parameters may indicate a preferred measurement range, measurement sensitivity, measurement sampling interval, and/or measurement type. Such information may for example be generated as supplemental debug information by a debugger of the electronic device.

According to a further embodiment, an apparatus for testing an electronic device is provided. The apparatus is configured to obtain first data by performing measurements on the electronic device while program code is being executed by one or more processors of the electronic device. Further, the apparatus is configured to monitor execution of the program code to obtain second data. Further, the apparatus is configured to coordinate the measurements with the monitoring of the execution of the program code. For example, the apparatus may comprise a measurement controller to implement these functionalities. The apparatus (or the measurement controller of the apparatus) may be configured to control or perform the steps of a method according to any one of the above embodiments.

According to an embodiment, the apparatus is configured to correlate the first data with the second data. For example, in this way a part of the program code may be identified which causes an anomaly observed in the first data. The correlation may for example be performed by a data processor of the apparatus.

According to an embodiment, the apparatus is configured to control the measurements depending on the second data. The control functionalities may comprise selecting a measurement range, measurement sensitivity, and/or measurement sampling interval depending on the second data. For example, if the second data indicate that the electronic device performs a certain operation which potentially causes excessive energy consumption, the measurement range, measurement sensitivity, and/or measurement sampling interval may be set accordingly. This may involve widening the measurement range or focusing the measurement range on an expected range of interest, increasing measurement sensitivity, and/or shortening the measurement sampling interval. Accordingly, the apparatus may dynamically adjust parameters for controlling the measurements to optimize the measurements depending on the operational status of the electronic device. In addition or as an alternative, the apparatus may be configured to select a measurement type depending on the second data. For example, under certain operational conditions of the electronic device, as indicated by the second data, the apparatus may select measurement of energy consumption, e.g., in terms of current consumption or power consumption, and/or absolute consumed energy. Under other operational conditions of the electronic device, as indicated by the second data, the apparatus may select measurement of temperature.

In addition or as an alternative, the apparatus may be configured to trigger one or more measurements depending on the second data. For example, under certain operational conditions of the electronic device, it may be desirable gain information about a temperature distribution within the electronic device. The temperature distribution may allow for identifying hardware elements with excessive current leakage or overloaded hardware elements. The temperature distribution may for example be obtained by capturing one or more thermal images of the electronic device or parts thereof. Accordingly, in some scenarios the apparatus may be configured to use the second data to trigger capturing of one or more thermal images.

The above control functionalities of the apparatus may for example be implemented by a measurement controller of the apparatus.

According to an embodiment the first data comprise data representing energy consumption of the electronic device, e.g., in terms of a current, a power, or an energy. The current, power, or energy may be measured by one or more internal sensors of the electronic device or by one or more external sensors coupled to the electronic device. The apparatus may comprise one or more of these external sensors and/or a measurement interface with respect to the internal sensor(s). Alternatively or in addition, the first data may comprise data representing a temperature of the electronic device. The temperature may be measured by internal sensors of the electronic device or by external sensors coupled to the electronic device. Also in this case, the apparatus may comprise one or more of these external sensors and/or a measurement interface with respect to the internal sensor(s).

According to an embodiment, the first data may comprise thermal images of at least a part of the electronic device. Such thermal images may be captured by an infrared camera, e.g., an LWIR (Long Wave Infrared Camera). The LWIR camera may be cooled or uncooled. The apparatus may comprise the infrared camera. Further, the apparatus may comprise a measurement interface with respect to such infrared camera. This measurement interface may be used to control the infrared camera, e.g., by triggering capturing of the thermal images. Further, this measurement interface may be used by the apparatus to receive the captured thermal images.

According to an embodiment, the second data comprise debug information from execution of the program code, e.g., information identifying and/or describing an instruction or routine of the program code which is currently being executed. Alternatively or in addition, the second data may comprise data identifying an operation and/or status associated with the execution of the program code, e.g., whether execution of the program code caused switching of the electronic device to a low power mode or activation of communication circuitry. According to an embodiment, the second data comprise application level information associated with the execution of the program code, e.g., information identifying an application which is currently being executed as part of the program code or a function within such application, e.g., activation of IP (Internet Protocol) based audio and/or video communication by a messaging application.

According to an embodiment, the second data comprise parameters for controlling the measurements. For example, these parameters may indicate a preferred measurement range, measurement sensitivity, measurement sampling interval, and/or measurement type. Such information may for example be generated as supplemental debug information by a debugger of the electronic device.

The apparatus may comprise a debug interface for receiving the second data.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to testing of an electronic device. The electronic device may for example correspond to a communication device, such as a smartphone or other kind of mobile phone, a tablet computer, or the like. Further, the electronic device may correspond to an IoT device, such as a smart sensor or actuator, smart home equipment, or the like. The electronic device may be a battery operated device, but other ways of powering the electronic device may be possible as well, e.g., using line power, solar energy, or electromechanical energy harvesting. Further, it is assumed that the electronic device is a software operated device having functionalities implemented by program code executed by at least one processor of the electronic device. This program code may include firmware or an operating system of the electronic device. In addition or as an alternative this program code may include one or more applications installed on the electronic device.

In the illustrated embodiments, it is assumed that measurements performed for testing the electronic device are coordinated with monitoring of execution of the program code by the processor(s) of the electronic device. This may involve setting parameters for controlling the measurements, such as measurement range, measurement sensitivity, or sampling interval, depending on data obtained by monitoring the execution of the program code, e.g., depending on debug information or data derived from debug information. For example, if the debug information indicates that a certain type of software routine is being executed, the measurement range may be narrowed to a corresponding range of interest, the measurement sensitivity increased, and optionally the sampling interval be shortened. Similarly, if the debug information indicates that another type of software routing is being executed, the measurement range may be widened, the measurement sensitivity reduced, and optionally the sampling interval be extended. In addition or as an alternative, this may involve triggering one or more measurements based on data obtained by monitoring the execution of the program code, e.g., depending on debug information or data derived from debug information. For example, if the debug information indicates that a certain type of software routine is being executed, temperature measurements or capturing of thermal images of the electronic device. The measurements may be performed by one or more sensors of test equipment and/or by one or more internal sensors of the electronic device.

By coordinating the measurements with the monitoring of the execution of the program code, it can be taken into account that sensors or measurement electronics are typically limited with respect to their resolution, which means that in order to increase measurement accuracy, it is typically necessary to use a reduced measurement range. On the other hand, such reduced measurement range may not be suitable to address all relevant measurement scenarios. By way of example, when measuring energy consumption of the electronic device in terms of an electric current supplied to the system, the value of the current may be very low while the electronic device is in a low power mode. In this case, it may be desirable to measure the current with high sensitivity so that it is possible to identify anomalies which may be indicative of excessive energy consumption in the low power mode. If the current does not exceed for example 10 mA, the measurement range may be limited to a maximum of 20 mA and a higher sensitivity (e.g., of 1 µA) achieved. However, in other scenarios, e.g., if the electronic device leaves the low power mode and for example activates radio circuitry, the current may exceed 20 mA and the above-mentioned measurement range not be suitable anymore. By monitoring the execution of the program code, this change of operating conditions may be detected and the measurement range adjusted accordingly, e.g., to a range limited to a maximum of 2000 mA, however with a lower sensitivity (e.g., of 100 µA). Accordingly, the monitoring of the program code may be used to select measurement parameters which are optimized to the current operating conditions, e.g., by dynamically adapting the measurement range. It is noted that the above scenario assuming a measurement of current is only one example, and that similar considerations may also be applied for measurements of voltages, electrical power, temperature, acceleration, or other physical quantities measured when testing the electronic device. Further, by triggering certain measurements depending on the monitoring of the execution of the program code, the measurements may be obtained when they can be expected to be relevant. For example, a thermal image or sequence of thermal images may be captured when the debug information indicates that the electronic device leaves the low power mode and for example activates radio circuitry. In this way, it can be achieved that the measurements are performed at the right time, thereby avoiding generating excessive amounts of measurement data in scenarios where the measurement data are not of particular relevance.

Figure 1:
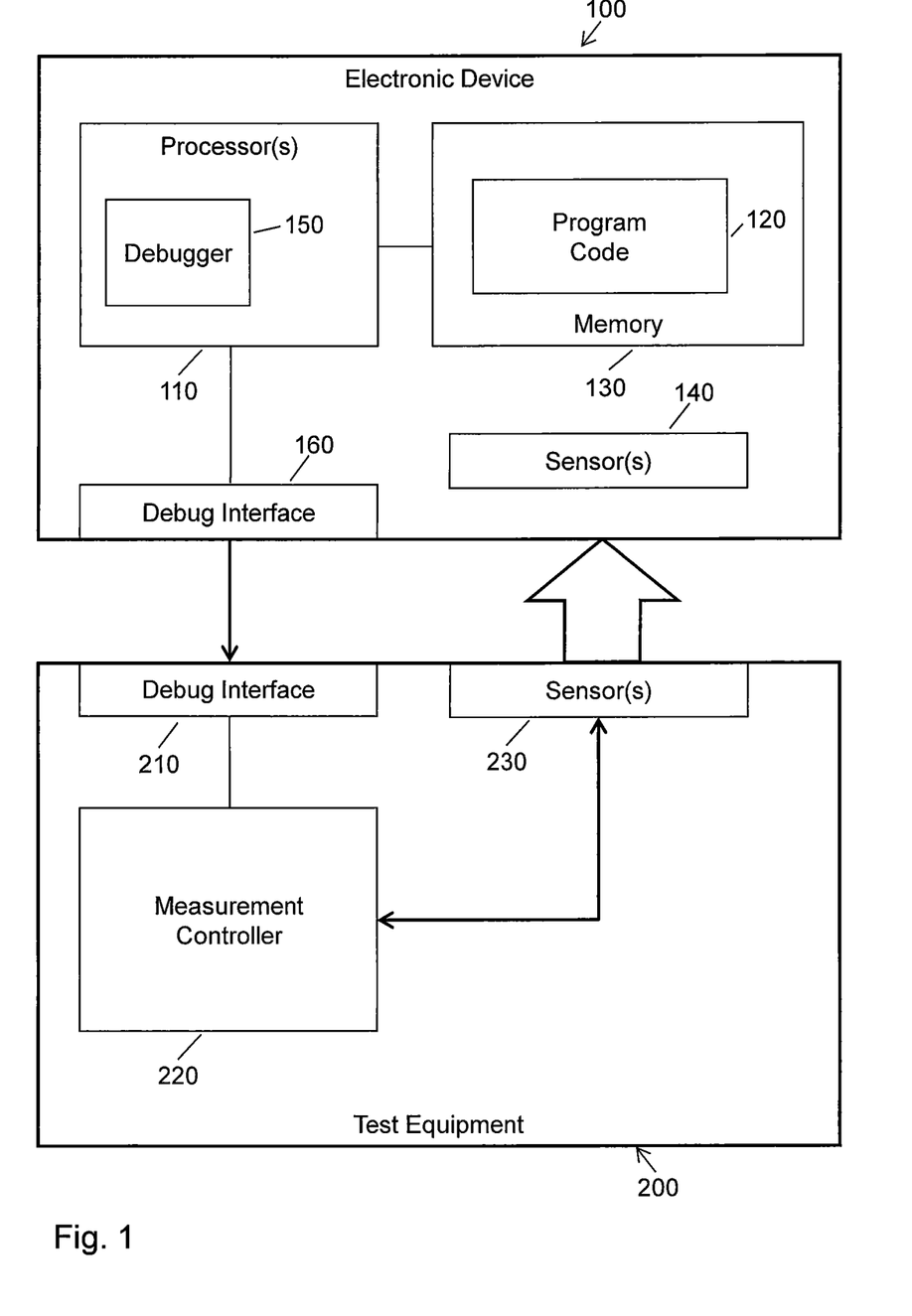
FIG. 1 schematically illustrates a test setup according to an embodiment of the invention.

FIG. 1 schematically illustrates a test setup according to an embodiment. As illustrated, the test setup includes an electronic device 100 and test equipment 200. The electronic device 100, which may be a communication device, such as a smartphone or other kind of mobile phone, a tablet computer, or an IoT device, such as a smart sensor or actuator, smart home equipment, or the like, is provided with one or more processors 110 which execute program code 120 stored in a memory 130 of the electronic device 100. The program code 120 may include firmware, an operating system, and/or applications installed on the electronic device 100. The electronic device 100 may be battery powered (by an internal battery or an external battery), which means that energy efficiency of the electronic device is of particular relevance.

As further illustrated, the electronic device 100 may include one or more sensors 140, e.g., for measuring current, voltage, power, temperature, or acceleration. Measurements performed by the sensor(s) 140 may be controlled by the processor(s) 110.

As further illustrated, the electronic device 100 is provided with a debugger 150 and a debug interface 160. Although the debugger 150 is illustrated as a part of the processor(s) 110, it is noted that the debugger 150 may actually be implemented by software, e.g., by further program code stored in the memory 130. However, the debugger 150 could also be a hardware functionality of the processor(s) 110. The debugger 150 generates debug information by monitoring execution of the program code 120 by the processor(s) 110, and through the debug interface 160, this debug information is made available to the test equipment 200. The debug interface 160 may for example correspond to a JTAG (Joint Test Action Group) debugging port, a USB (Universal Serial Bus) debugging port, serial port (e.g., based on RS 232), or some other type of interface.

The test equipment 200 includes a debug interface 210, a measurement controller 220, and one or more sensors 230. The debug interface 210 is used for receiving the debug information from the electronic device 100. The measurement controller 220 uses the received debug information for coordinating measurements performed by the sensor(s) 230 on the electronic device 100 with the execution of the program code by the processor(s) 110 of the electronic device 100 or information derived from the monitoring of the execution of the program code. For example, the sensor(s) 230 could measure current levels, voltage levels, or power levels so as to assess energy consumption of the electronic device 100. It is noted that also the internal sensor(s) 140 of the electronic device 100 could be utilized in the measurements and coordinated by the measurement controller 220 depending on the debug information. For example, measurements performed by the sensor(s) 140 could be controlled through a measurement interface of the electronic device 100, and results of the measurements performed by the sensor(s) 140 could be provided through the measurement interface to the test equipment 200. By way of example, the debug interface 160 of the electronic device 100 and the debug interface 210 of the test equipment 200 could also be used to implement such measurement interface.

In some scenarios, the sensor(s) 230 of the test equipment 200 may also include one or more cameras for capturing thermal images of the electronic device 100 or parts of the electronic device 100. For example, the sensors 230 could include one or more LWIR cameras. To achieve higher accuracy of the thermal images, the LWIR camera(s) may be cooled. However, it is also possible to use an uncooled LWIR camera. In such scenarios, the measurement controller 220 of the test equipment 200 may utilize the debug information from the electronic device 100 to trigger capturing of one or more thermal images by the camera(s). Further, the test equipment 200 may correlate the debug information with the captured thermal images.

The debug information which is made available to the test equipment 200 can include low-level debug information, such as information identifying and program code instruction or program code routine currently executed by the processor(s) 110. The measurement controller 220 may then interpret this information to identify the present and/or upcoming operational state of the electronic device 100 and set one or more parameters for controlling the measurements accordingly. However, in some cases the debug information may also include supplemental information for controlling the measurements. For example, the supplemental information could include a clear text description of a measurement mode or measurement parameters to be applied, e.g., by defining "maximum current of 10 mA". Further, the supplemental information may specify when such measurement mode or measurement parameters are to be applied, e.g., by defining "maxim current of 10 mA, starting in 1 ms and lasting for 100 ms".

Further, the supplemental information may include application level information to be interpreted by the measurement controller 220. For example, the supplemental information could indicate that the electronic device 100 is now engaged in a voice call. The measurement controller 220 may derive from this indication that an operating current the electronic device 100 will generally be very low but increase every 20:th ms (in accordance with a typical transmission pattern of voice data during a voice call), and dynamically adjust a measurement range for measuring the operating current in accordance with this expected pattern.

In some scenarios, certain information which is made available to the test equipment with the debug information may also be embedded into the program code, e.g., by a plug-in of a compiler used to compile the program code. This plug-in for the compiler could analyze the low level code being compiled and embed information for controlling the measurements into the compiled code, which is then extracted by the debugger 150 to be made available to the test equipment 200. Such embedded information may also be based on a priori information on the hardware of the electronic device 100, e.g., information on type of the processor(s) 110 and/or information of type(s) of hardware that connected to processor(s) 110, e.g., type of radio interface circuitry.

An exemplary use case may be as follows: While the processor(s) 110 execute the program code 120, the test equipment 200 performs measurements of an operating current of the electronic device 100. Together with the debug information, the test equipment 200 receives an indication that an IP-based voice call was accepted by the electronic device 100. Based on information on the hardware of the electronic device 100, e.g., as obtained from a web service or some other external or internal database, the measurement controller 220 of the test equipment identifies measurement profiles applicable to the hardware configuration of the electronic device 100 and selects measurement parameters applicable to the scenario "IP-based voice call". The measurement controller 220 then performs the measurements based on these measurement parameters. For example, these measurement parameters may reflect an expected behavior of the measured operating current, characterized an idle current is 10 µA and a peak current of 220 mA occurring for 3 ms with 20 ms intervals. The measurement controller 220 may then coordinate the measurements so that the idle current is measured with high sensitivity in the intervals between the expected occurrences of the peak current, and the measurement range is increased (and at the same time the measurement sensitivity is reduced) when the peak current is expected to occur. If an excessive current is detected while using the high sensitivity, the measurement controller 220 may suspend the measurements or revert to a default set of measurement parameters (e.g., based on a maximum measurement range for the current). As can be seen, the measurements may also be used to precisely identify deviations from the expected behavior, which may help to identify anomalies and potential problems causing excessive energy consumption.

A further exemplary use case may be as follows: While the processor(s) 110 execute the program code 120, the test equipment 200 measures an operating current of the electronic device 100. Together with the debug information, the test equipment 200 receives an indication that the electronic device will now enter a sleep mode for 800 ms. From previous measurements, the test equipment 200 has already learned that the maximum operating current of the electronic device 100 in the sleep mode ease 1 mA. Accordingly, the measurement controller 220 sets the measurement range for measuring the operating current to a maximum of 1 mA, with a corresponding high sensitivity of for example 1 µA, while the electronic device 100 is expected to be in the sleep mode. Using the high sensitivity during the sleep mode allows for a very accurate estimation of energy consumption during the sleep mode. At the expected and of the sleep mode, i.e., shortly before expiry of the 800 ms interval, the measurement controller 220 switches back to a wider measurement range and lower sensitivity, e.g., corresponding to a maximum current of 1000 mA and sensitivity of 1 mA. Using the high sensitivity during the sleep mode allows for a very accurate estimation of energy consumption during the sleep mode.

A still further exemplary use case may be as follows: While the processor(s) 110 execute the program code 120, the test equipment 200 captures thermal images of the electronic device 100. This can be accomplished by using one camera, e.g., an LWIR camera, or by using multiple cameras, e.g., multiple LWIR cameras. For example, one camera could be used to generate thermal images completely covering a PCB (printed circuit board) of the electronic device 100, while another camera focuses on a certain individual component on the PCB, e.g., a main processor. Further, in some scenarios also thermal images covering the entire electronic device 100 may be captured, e.g., images also covering a housing of the electronic device 100. As a result, high resolution images of the individual component can be generated, which may allow for assessing how different parts of the component heat up. In order to allow for correlating the thermal images with certain parts of the program code, the debug information provided to the test equipment 200 he is used for coordinating the capturing of the thermal images with the execution of the program code. For example, the thermal images may be tagged based on the debug information, e.g., with information identifying a certain program instruction or program routine being executed. In addition or as an alternative, capturing of the thermal images may be triggered based on the debug information or otherwise controlled based on the debug information. For example, execution of a certain program construction or program routine may trigger capturing a thermal image or capturing of the sequence of thermal images.

Further, a sampling time interval for capturing a sequence of thermal images may be controlled based on the debug information. For example, if the debug information indicates that the electronic device starts download of data from a network, capturing of the sequence of thermal images at high resolution and/or high speed may be triggered.

The thermal images may then be analyzed to identify parts subject to excessive heating, which may correspond to components circuit elements contributing to excessive energy consumption. For example, such excessive heating may be due to hardware issues, such as mismatched radiofrequency circuits, leaks through ESD (electrostatic discharge) protection diodes, losses in capacitors, inductors, or interconnections of a PCB, resistive losses in transistors, capacitive losses in semiconductor switches, or high frequency losses in magnetic components. Further, search excessive heating may be due to software issues, such as unnecessary data transfers, incorrect utilization of low power features (e.g., deactivation of circuit components), incorrect settings of parameters, e.g., a too high clock frequency setting, omitted termination of applications or other software called modules, or the like. In some scenarios, the captured thermal images may also be correlated with other measurements, e.g., measurements of currents. In the latter case, a measured excessive current may be correlated to an excessively heating part observed in thermal images, which may allow for efficiently and accurately identifying involved hardware elements.

Figure 2:
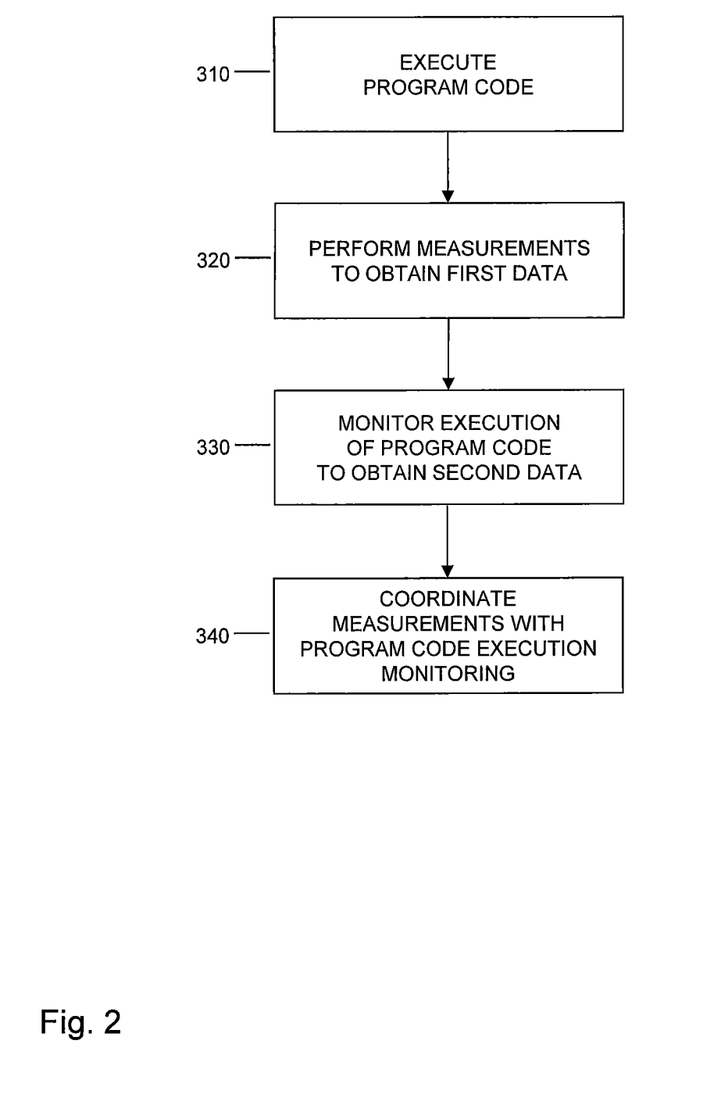
FIG. 2 shows a flowchart for illustrating a method according to an embodiment of the invention.

FIG. 2 shows a flowchart illustrating a method for testing an electronic device, e.g., the electronic device 100. At least a part of the steps of the method may be performed and/or controlled by a measurement controller, such as the above-mentioned measurement controller 220.

At step 310, program code is executed by one or more processors of the electronic device. The program code may include (at least in part) firmware, an operating system of the electronic device, and/or one or more applications installed on the electronic device.

At step 320, measurements are performed on the electronic device to obtain first data. The measurements are performed while executing the program code. The first data may include data representing energy consumption of the electronic device. The first data may include or be derived from results of measurements of current, voltage, power, or the like. The first data may also include or be derived froth results of temperature measurements. Further, the first data may include thermal images of at least a part of the electronic device. The measurements may be performed by external sensors (such as the sensors 230 of FIG. 1) or by internal sensors of the electronic device (such as the sensors 140 of FIG. 1).

At step 330, execution of the program code is monitored to obtain second data. The second data may include or be derived from debug information from execution of the program code. For example, the second data may include data identifying an operation and/or status associated with the execution of the program code, e.g., in terms of a currently executed program code instruction or program code routine. Further, the second data may include application level information associated with the execution of the program code; e.g., information identifying an application or function of an application currently being executed as part of the program code.

At step 340, the measurements of step 320 are coordinated with the monitoring of step 330. This may involve controlling the measurements depending on the second data obtained at step 330. For example, a measurement range, measurement sensitivity, measurement sampling interval, and/or measurement type may be selected depending on the second data.

Further, one or more of the measurements may be triggered depending on the second data. Still further, this may involve supplementing the first data with information concerning the execution of the program code at the time of performing the measurements for obtaining the first data. For example, the first data could be supplemented with information identifying a program code instruction or program code routine which is being executed while performing the measurements to obtain the first data.

Figure 3:
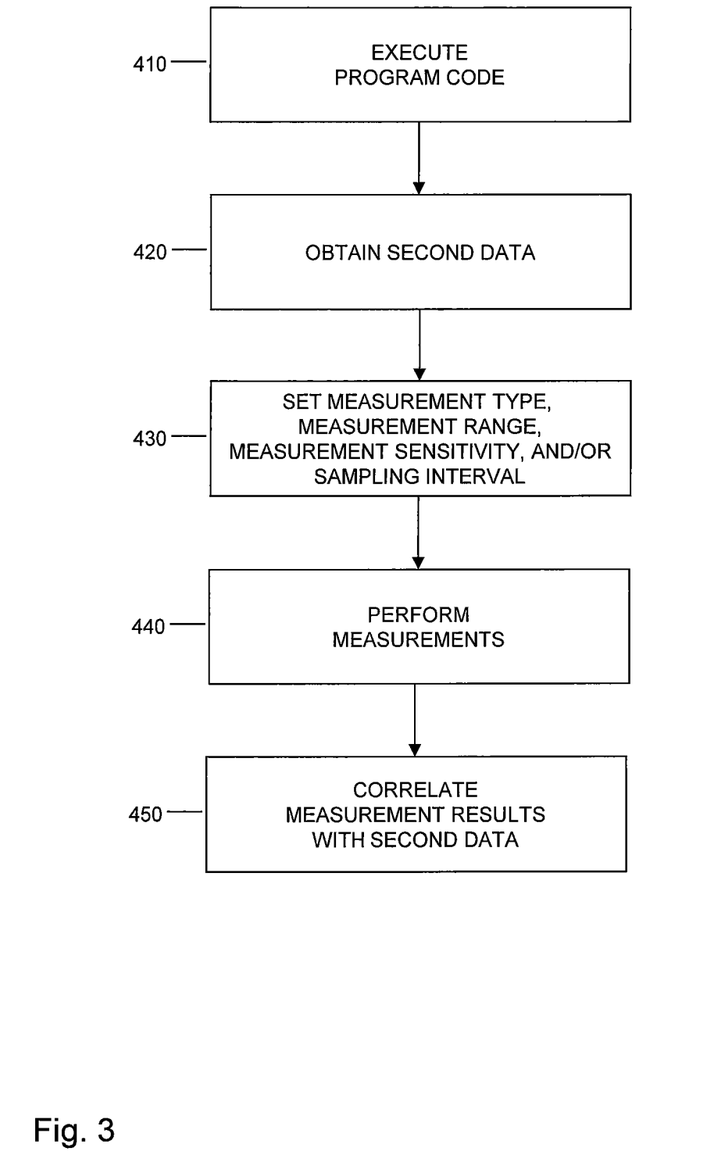
FIG. 3 shows a flowchart for illustrating a further method according to an embodiment of the invention.

FIG. 3 shows a flowchart illustrating a method for testing an electronic device, e.g., the electronic device 100, which is based on the generic procedures of FIG. 2. As in the case of the method of FIG. 2, at least a part of the steps of the method may be performed and/or controlled by a measurement controller, such as the above-mentioned measurement controller 220.

At step 410, the program code is executed by one or more processors of the electronic device (e.g., as explained in connection with step 310).

At step 420, the second data are obtained by monitoring the execution of the program code (e.g., as explained in connection with step 320).

At step 430, a measurement type, measurement range, measurement sensitivity, and/or sampling time interval is set depending on the second data obtained at step 420. For example, the measurement range may be narrowed and measurement sensitivity increased in response to the second data indicating a certain operation being performed by the electronic device. For example, the measurement range for measuring and operating current of the electronic device may be narrowed by selecting a lower maximum current, thereby achieving a higher sensitivity. As a result, measurement parameters may be optimized depending on the operational conditions or status of the electronic device.

At step 440, the measurements are performed based on the measurement parameters set at step 430. By using the settings from step 430, the measurements can be performed based on measurement parameters which are optimized to achieve a desired accuracy. Further, situations can be avoided in which the measured quantity is outside the selected measurement range, resulting in potential loss of measurement data, damaging of senders, or errors of the utilized test equipment.

At step 450, the measurements performed at step 440 may be correlated with the second data obtained at step 420. For example, the first data derived from the measurements may be supplemented with information identifying a program code instruction or program code routine being executed while performing the measurements. In this way, potential sources of anomalies observed in the first data may be identified in the program code. By way of example, this may allow for identifying a part of the program code which causes excessive energy consumption of the electronic device. Accordingly, the measurements of step 420 may utilized as a basis for optimizing energy efficiency of the electronic device.

Figure 4:
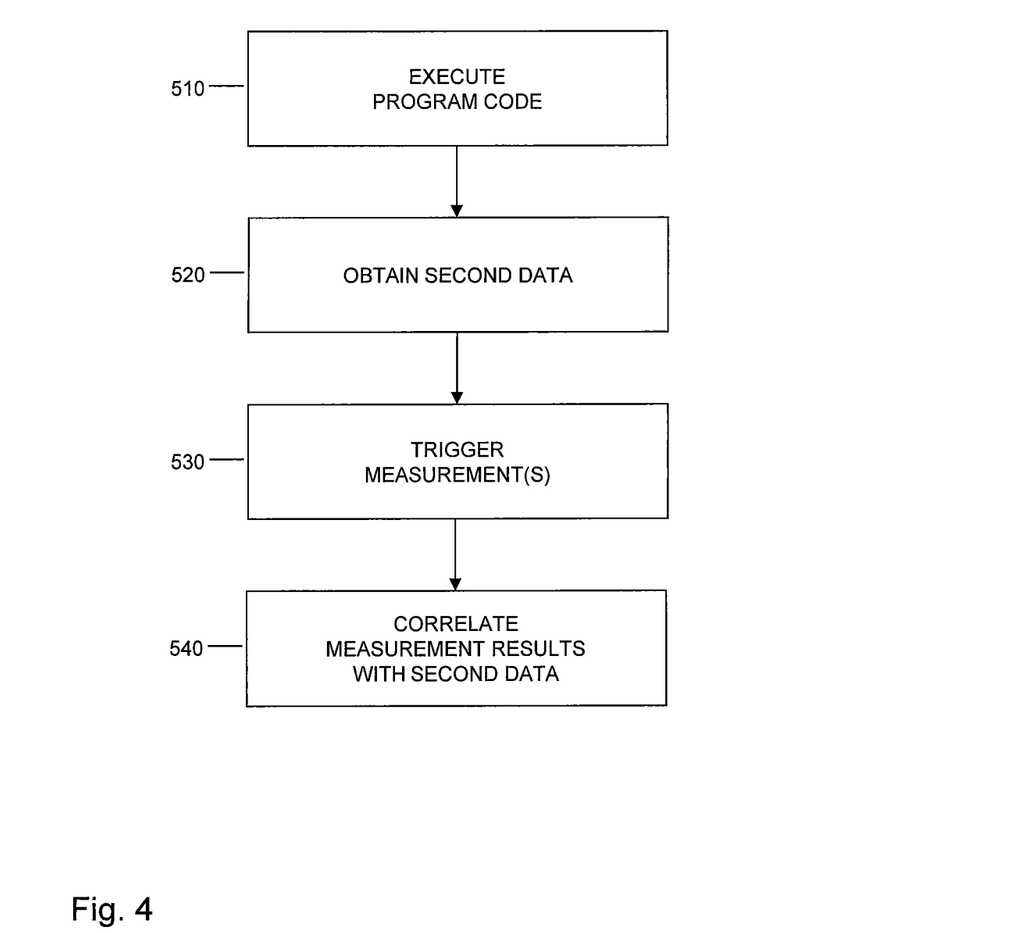
FIG. 4 shows a flowchart for illustrating a further method according to an embodiment of the invention.

FIG. 4 shows a flowchart illustrating a method for testing an electronic device, e.g., the electronic device 100, which is based on the generic procedures of FIG. 2. As in the case of the method of FIG. 2, at least a part of the steps of the method may be performed and/or controlled by a measurement controller, such as the above-mentioned measurement controller 220.

At step 510, the program code is executed by one or more processors of the electronic device (e.g., as explained in connection with step 310).

At step 520, the second data are obtained by monitoring the execution of the program code (e.g., as explained in connection with step 320).

At step 530, measurements are triggered based on the second data obtained at step 520. For example, capturing of a thermal image or of a sequence of thermal images may be triggered. As an alternative or in addition, also measurements of temperature, current, voltage may be triggered. Various kinds of trigger events may be defined. By way of example, execution of a certain program code instruction or program code routine could be defined as a trigger condition.

At step 540, the measurements performed at step 530 may be correlated with the second data obtained at step 520. For example, results of the measurements may be supplemented with information identifying a program code instruction or program code routine being executed while performing the measurements. In this way, potential sources of anomalies observed in the measurement results, such as in thermal images, may be identified in the program code. Further, certain components of the electronic device may be identified as potential sources of anomalies. For example, components for which the thermal images indicate excessive heating, such as heating which is not expected from operational conditions or status as indicated by the second data obtained at step 520, may be identified as causing excessive energy consumption. Accordingly, the measurements of step 520 may utilized as a basis for optimizing energy efficiency of the electronic device.

It is to be understood that the concepts as explained above are susceptible to various modifications. For example, the concepts could be applied in connection with various kinds of electronic devices. Further, the concepts may be utilized in connection with various measurement types, without limitation to the above-mentioned measurement types. Further, it is noted that in some scenarios testing functionalities based on the concepts as described above may be integrated within the electronic device. By way of example, in the exemplary setup of FIG. 1, the electronic device 100 could include at least some of the elements of the test equipment 200, e.g., the measurement controller 220, and the measurement controller 220 could coordinate measurements performed by internal sensors of the electronic device (e.g., by the sensors 140).

The invention claimed is:

1. A method for testing an electronic device, the method comprising:
   while program code is executed by one or more processors of the electronic device, performing measurements, by a test equipment on the electronic device to obtain first data;
   receiving, by the test equipment from a debug interface of the electronic device, debug information from monitoring execution of the program code;
   deriving, by the test equipment, second data from the debug information; and
   coordinating, by the test equipment, the measurements with the monitoring execution of the program code by controlling the measurements depending on the second data.

2. The method according to claim 1, further comprising: correlating the first data with the second data.

3. The method according to claim 1,
   wherein said controlling of the measurements comprises selecting at least one of a measurement range, a measurement sensitivity, and a measurement sampling interval.

4. The method according to claim 1,
   wherein said controlling of the measurements comprises selecting a measurement type.

5. The method according to claim 1,
   wherein said controlling of the measurements comprises triggering one or more of the measurements.

6. The method according to claim 1,
   wherein the first data comprise data representing energy consumption of the electronic device.

7. The method according to claim 1,
   wherein the first data comprise data representing a temperature of the electronic device.

8. The method according to claim 1,
   wherein the first data comprise thermal images of at least a part of the electronic device.

9. The method according to claim 1,
wherein the second data comprise data identifying an operation and/or status associated with the execution of the program code.

10. The method according to claim 1,
wherein the second data comprise application level information associated with the execution of the program code.

11. The method according to claim 1,
wherein the second data comprise parameters for controlling the measurements.

12. An apparatus for testing an electronic device, the apparatus comprising:
- at least one sensor configured to obtain first data by performing measurements on the electronic device while program code is being executed by one or more processors of the electronic device;
- a debug interface configured to monitor execution of the program code to obtain second data; and
- a measurement controller configured to coordinate the measurements with monitoring of the execution of the program code by controlling the measurements depending on the second data.

13. The apparatus according to claim 12,
wherein the measurement controller is further configured to correlate the first data with the second data.

14. The apparatus according to claim 12,
wherein the first data comprise at least one of data representing energy consumption of the electronic device, a temperature of the electronic device, and thermal images of at least a part of the electronic device.

15. The apparatus according to claim 12,
wherein the second data comprise at least one of debug information from execution of the program code, data identifying an operation and/or status associated with the execution of the program code, application level information associated with the execution of the program code, and parameters for controlling the measurements.

* * * * *

UNITED STATES PATENT AND TRADEMARK OFFICE
CERTIFICATE OF CORRECTION

PATENT NO. : 10,649,880 B2
APPLICATION NO. : 15/620383
DATED : May 12, 2020
INVENTOR(S) : Plicanic Samuelsson et al.

Page 1 of 1

It is certified that error appears in the above-identified patent and that said Letters Patent is hereby corrected as shown below:

On the Title Page

Item (30) Foreign Application Priority Data:
Please correct "16174375" to read -- 16174375.2 --

Signed and Sealed this
Thirteenth Day of October, 2020

Andrei Iancu
*Director of the United States Patent and Trademark Office*